Figure 1:
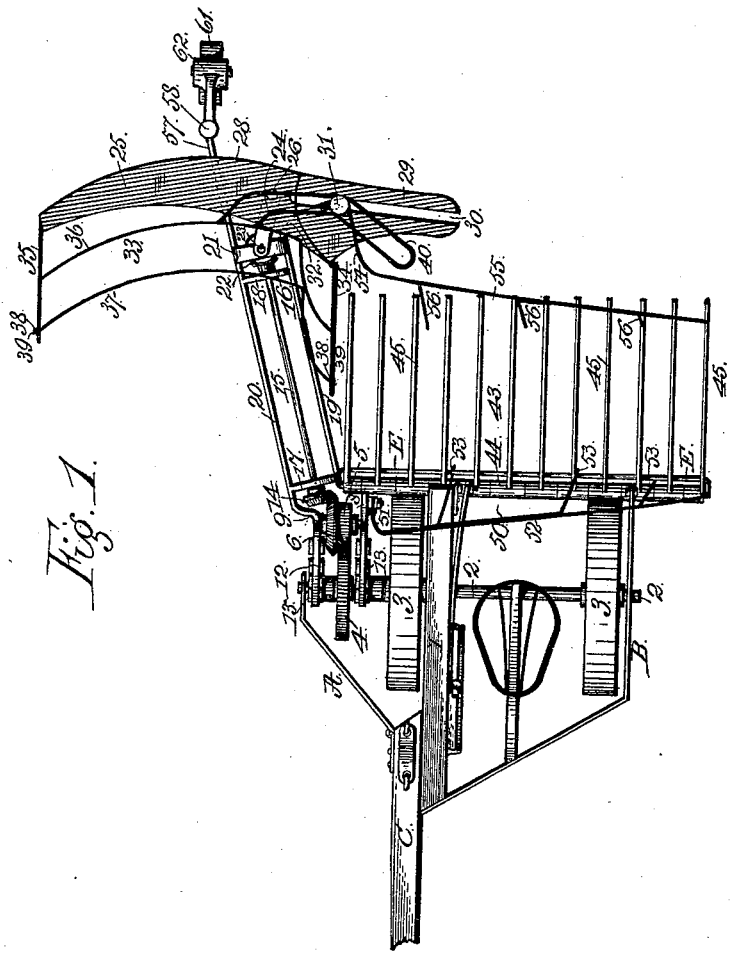

(No Model.) 2 Sheets—Sheet 1.

J. KEYS.
CORN HARVESTER.

No. 449,652. Patented Mar. 31, 1891.

WITNESSES:

INVENTOR
John Keys
BY A. J. O'Brien
ATTORNEY (No Model.)
2 Sheets—Sheet 2.
J. KEYS.
CORN HARVESTER.
No. 449,652.  Patented Mar. 31, 1891.
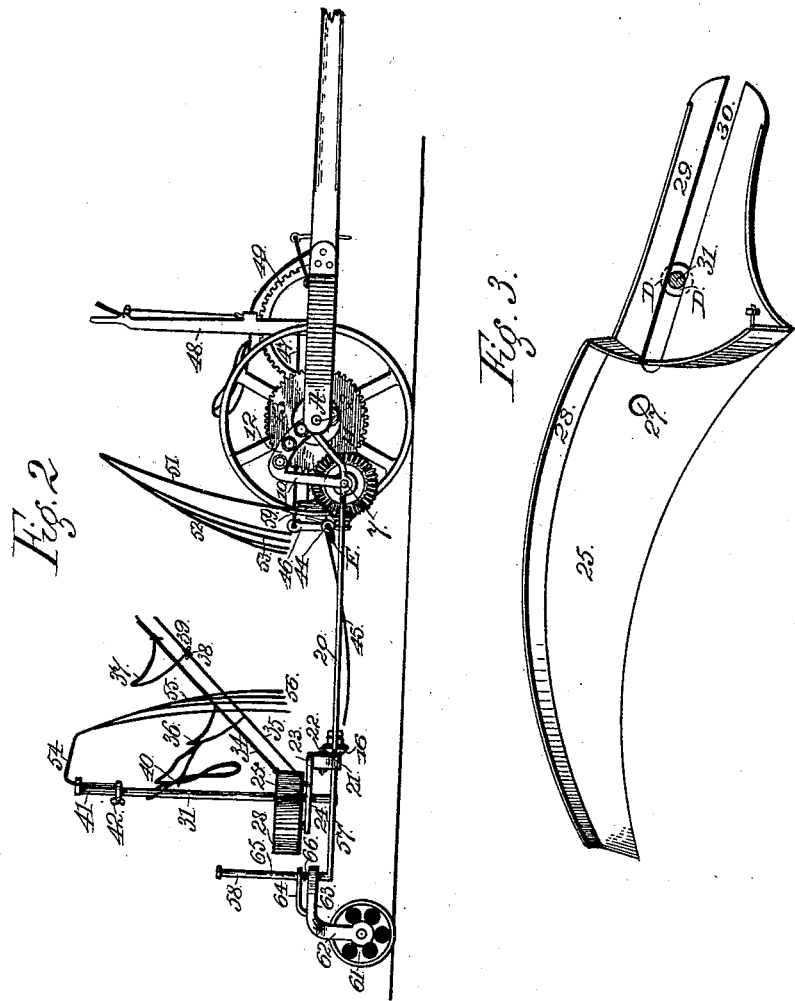
WITNESSES:
INVENTOR
John Keys
BY
ATTORNEY.

UNITED STATES PATENT OFFICE.

JOHN KEYS, OF BELOIT, KANSAS, ASSIGNOR TO THE KEYS CORN HARVESTER AND MACHINERY MANUFACTURING COMPANY, OF DENVER, COLORADO.

CORN-HARVESTER.

SPECIFICATION forming part of Letters Patent No. 449,652, dated March 31, 1891.

Application filed September 17, 1889. Serial No. 324,274. (No model.)

*To all whom it may concern:*

Be it known that I, JOHN KEYS, a subject of the Queen of Great Britain, residing at Beloit, in the county of Mitchell and State of Kansas, have invented certain new and useful Improvements in Corn-Harvesting Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in corn-harvesting machines of the class in which the corn or other similar material after being cut is carried by the knife or sickle and suitable attachments and thrown upon an adjustable platform or dropper, whence it is let fall in bunches or sheaves of any desired size. The object, therefore, of my invention is to provide a machine of the class stated which shall be comparatively simple in construction, economical in cost, durable, easily operated, and efficient; to which ends my invention consists of the features, arrangements, and combinations hereinafter described and claimed.

In the drawings is shown an embodiment of my invention, in which drawings Figure 1 is a plan or top view of the entire machine. Fig. 2 is an elevation or side view of the same. Fig. 3 is an enlarged view of the knife or sickle.

In the drawings let the reference-numeral 1 indicate a suitable frame-work, provided with braces A and B, through which braces pass the extremities of the main shaft 2. These braces are secured upon the shaft in any suitable manner. Brace A is hinged to the tongue C of the machine, so that its opposite extremity may be easily removed from shaft 2 and swung around laterally when it may be necessary. Upon shaft 2 are mounted and made fast the two large driving-wheels 3 3. To this shaft is also secured the cog-wheel 4, which meshes in a similar cog-wheel 5, secured to and turning with the bevel gear-wheel 6 upon a short shaft 7, which last-named shaft is journaled in and supported by bars 8 and 9, these bars being rigidly connected or continuous with arms 11, which, with upright arms 10, are made fast to the curved plates 12 on each side of the gear-wheel 4. These plates 12 form part of the periphery of a circle having its center at shaft 7, and are provided with a number of apertures 13, each of which is the same distance from shaft 7, since these distances are radii of a circle having its center at the last-named shaft. Apertures 13 form bearings for main shaft 2 on each side of cog-wheel 4. Hence it follows that whichever pair of apertures 13 in plates 12 the shaft 2 may occupy, cog-wheel 4 on shaft 2 will always mesh with the cog-wheel on shaft 7.

Meshing with bevel-gear 6 is a smaller similar wheel 14, made fast to one extremity of a shaft 15, which at its opposite extremity is provided with another small bevel gear-wheel 16. Shaft 15 is supported by and passes through apertures in the center of cross-plates 17 and 18, the extremities of which are secured to the bars 19 and 20, which are rigidly connected or are continuous with bars 8 and 9, and extend on either side of and parallel with the shaft 15. Bars 15, 19, and 20 are deflected outward as they extend backward, thereby forming an angle with the line of the machine's forward movement, as shown in Fig. 1.

To bars 19 and 20, and just back of the rear extremity of the shaft 15, is attached the support 21, which is sufficiently elevated above the bars to which it is secured to allow the small bevel-gear 22 room to rotate horizontally beneath the support and mesh with bevel gear-wheel 16. Wheel 22 is made fast to a short vertical shaft 23, the upper extremity of which is journaled within the center of support 21 and the lower extremity within a cross-bar (not shown) directly beneath this support, under said cross-bar also connecting bars 19 and 20.

Shaft 23 extends far enough above support 21 to allow the attachment of one extremity of a crank-arm 24 of suitable length, which arm being made fast to the shaft rotates therewith.

The knife or sickle 25 stands at all times in a horizontal position, or nearly so, and is pivoted to the outer extremity of crank-arm 24.

The pivot 26 is made fast to arm 24 and stands in a vertical position, extending up through the aperture 27 in the knife, to which it is fastened by riveting or in any other suitable manner, the knife being allowed to move freely upon the pivot.

The knife 25 is shaped substantially as shown in the drawings, and is provided with a rim or flange 28 and rear guide or tail-piece 29, provided with a longitudinal slot 30.

To the knife 25 is hinged a rack or frame 33, composed of the standard 35, hinged to the knife near its point, the standard 34, hinged to the rear part of the flange 28, and the ribs 36 and 37, attached to and connecting the standards 34 and 35, said ribs having the general shape of the flange or rear outline of the knife. The upper rib 37 is adjustable vertically and has its extremities attached to sleeves 38, which receive their corresponding standards. Sleeves 38 are provided with set-screws 39, passing through the sleeves and coming in contact with the standards. By means of this mechanism the height of rib 37 above the knife may be adjusted to suit the purpose according to the height of the corn to be cut. Attached to rib 36 and extending backward therefrom is an irregularly-curved guide or way 40, shaped substantially as shown in the drawings.

31 is a standard secured at its lower extremity to a bar 32, which is rigidly connected or continuous with bar 19 at the rear extremity of the last-named bar. Bar 32 is shown only by dotted lines in Fig. 1. Standard 31 is of any suitable height and passes through slot 30 of the knife and the way or guide 40 of rack 33.

Above and below the tail-piece 29 of the knife and attached to and surrounding standard 31 are flanges D D, forming grooved ways for the opposite edges of slot 30 in the tail-piece. The standard thus holds the knife uniformly in a true horizontal position, and, in combination with the propelling mechanism, gives the knife a steady, uniform, and well-balanced movement.

The movement of the knife must be sufficiently rapid relatively to the forward movement of the machine, so that in making each subsequent sweep the knife begins to cut the corn or other material at the point where it ceased to cut during its preceding sweep, thereby cutting a practically straight swath or leaving the edge of the standing corn parallel with the outline of the field.

Standard 31 is provided with a sleeve 41 and a set-screw 42, by means of which parts its height may be adjusted as desired.

In the rear of the driving-wheels, and suitably hinged to and supported by the frame-work of the machine, is the adjustable platform or dropper 43, composed of the bar 44, another bar E connected therewith, and the fingers 45, each of which is separate and distinct from the other and separately hinged to the bar 44, which bar is securely hinged to the frame-work of the machine. Fingers 45 are supported by the bar E underneath them, said bar being in the rear of bar 44. Thus, if a finger 45 comes in contact with a stone or other foreign substance underneath, it is free to rise independently of the other fingers, while all the fingers, being supported underneath by bar E, are prevented from falling below such bar.

To bar 44 is secured the upright arm 46, to which is hinged the draw-bar 47, connected with an ordinary lever 48, which lever, in combination with a ratchet 49, affords suitable means of raising and lowering the dropper. Suitably attached to the stationary frame-work of the machine, and extending above and just in front of the dropper, is a rack or frame 50, composed of the upright bar 51, the bar 52, and the fingers 53. Bar 52 is, by means of a curve, continuous with bar 51 and extends the entire length of the dropper. The fingers 53 are attached to bar 52 and extend downward therefrom nearly to the dropper.

The object of rack 50 is to guide the corn as it falls upon the dropper and prevent it from falling forward upon other parts of the mechanism. The height of this rack above the dropper is regulated by raising and lowering the upright bar 51 within a suitable socket or base 59. Bar 51 is adjustably secured in base 59 in any suitable manner.

Attached to the top of sleeve 41 of the standard 31 is a rack 54, composed of a curved bar 55 and fingers 56. Bar 55 extends forward from standard 31 until it reaches a point above or nearly above the rear extremities of fingers 45 of the dropper. From this point it turns and extends at right angles or nearly at right angles to fingers 45 the entire length of the dropper.

Fingers 56 are attached to and extend downward from bar 55. Rack 54 guides the material as it falls upon the dropper, and assists in holding it thereon as long as desired, performing a similar office in the rear of the dropper to that of rack 50 in front. The height of rack 54 is regulated by raising and lowering the adjustable sleeve 41.

Attached to the rear extremity of bar 20, and continuous therewith in the same direction, is the bar 57, to the rear extremity of which is attached the upright bar 58.

61 is a caster-wheel, capable of rotation within a suitable frame 62, which is connected with upright bar 58 by means of arms 63 and 64, each arm being provided with an eye, through which the upright bar passes and within which said bar slides easily.

Bar 58 is provided with holes 65 for the reception of a pin 66. Arms 63 and 64 are maintained in any suitable position upon bar 58 by placing the pin 66 in a hole 65 between these arms, thus preventing them from sliding up or down upon the bar after adjustment.

In the use of my improved machine motion is communicated from the main driving-shaft 2 to the knife 25 by virtue of the mechanism heretofore described. Let us suppose the knife to be in the position shown in Fig. 1. As soon as the machine is set in motion shaft 23 begins to turn. During every revolution of this shaft the knife is carried forward, cuts the material in its path, and carries it to the dropper, upon which it falls by virtue of the action of rack 33, the position of which is controlled by the guide or way 40 as it moves back and forth upon the standard 31. When the corn is ready to be thrown upon the dropper, rack 33 assumes the position shown in Fig. 2, by virtue of the guide or way 40 being in the position upon the standard 31 shown in Fig. 1. This inclined position of the rack 33 is assumed twice during each revolution of shaft 23—once when the knife is in the position shown in Fig. 1 and again when the corn is ready to be delivered to the dropper. After the corn is thrown upon the dropper in the manner described, the knife returns to its original position, (shown in Fig. 1,) the crank-arm 24 having made a complete revolution. When the dropper is sufficiently loaded, it is lowered, by virtue of the mechanism heretofore described, and its contents allowed to slide off. The distance above the ground to which the corn is to be cut is regulated by the adjustment of arms 63 and 64 upon upright bar 58, and by raising or lowering the shaft 7 and its connecting parts, and by placing main shaft 2 in suitable apertures 13 of plates 12.

It should be observed that shaft 15 and its parallel bars should always be maintained in a horizontal position.

Though my improved machine is designed more particularly for harvesting corn it will also be found equally useful in cutting sugar-cane, sorghum, and all similar plants having coarse stalks or stems.

Having thus described my invention, what I claim is—

1. In a corn-harvesting machine, the combination, with a suitable frame-work and a main shaft with driving-wheels mounted thereon, of a knife 25, provided with a flange 28 opposite its cutting-edge and a tail-piece 29, provided with a longitudinal slot 30, stationary grooved ways for the opposite edges of slot 30, a rotating crank-arm to one extremity of which the knife is pivoted, and suitable means for propelling said crank-arm, substantially as described.

2. In a corn-harvesting machine, the combination, with a suitable frame-work, a main shaft and driving-wheels mounted thereon, of a knife 25, provided with a flange 28 opposite its cutting-edge and a tail-piece 29, having a longitudinal slot 30, a rack 33, hinged to the knife and constructed of upright bars 34 and 35, a plural number of ribs connecting said bars, and an irregularly-curved way or guide 40, a stationary standard 31, passing through guide 40 and provided with grooved ways for the edges of slot 30, a crank-arm, to which the knife is pivoted, and suitable mechanism for rotating said crank-arm, substantially as described.

3. In a corn-harvesting machine, the combination, with a frame-work and a main shaft with driving-wheel mounted thereon, of a knife 25, provided with a tail-piece 29, having a longitudinal slot 30, a rack 33, hinged to the knife and consisting of upright bars 34 and 35, each of said bars having a sleeve adjustably secured to its upper portion, rib 36, connecting bars 34 and 35 below the sleeves, and rib 37, connecting the adjustable sleeves on said bars, and an irregularly-curved way or guide 40, attached to rib 36, a stationary standard 31, passing through guide 40 and provided with grooved ways for the opposite edges of slot 30, a crank-arm, to which the knife is pivoted, and suitable mechanism for rotating said crank-arm, substantially as described.

4. In a corn-harvesting machine, the combination, with a knife 25, provided with a flange 28 opposite its cutting-edge, a tail-piece 29, having a slot 30, an adjustable rack 33, hinged to the knife and provided with the irregularly-curved guide or way 40, the standard 31, which passes through guide 40 and is provided with grooved ways for the edges of slot 30, a rotating crank-arm 24, to which the knife is pivoted, and mechanism for rotating said crank-arm, substantially as described.

5. In a corn-harvesting machine, an adjustable platform or dropper adapted to receive the corn after being cut and carried thereto by the knife, said dropper consisting of a bar 44, hinged to the frame-work of the machine, fingers independent from each other, and a bar E, rigidly connected with bar 44 and extending underneath the fingers and in contact therewith, bar E being located in the rear of bar 44, and suitable mechanism for raising and lowering the dropper, in combination with a rack located just forward of the dropper and consisting of an upright bar 51 adjustably secured within a suitable stationary base, a top bar, and a plural number of fingers attached to the top bar and extending downward therefrom, substantially as described.

6. In a corn-harvesting machine, an adjustable platform or dropper adapted to receive the corn as it is delivered from the knife, said dropper consisting of a bar 44, hinged to the stationary frame-work of the machine, fingers 45, hinged to bar 44, said fingers being separate and independent from each other, and suitable mechanism for raising and lowering the dropper, in combination with a rack 54, suitably and adjustably supported above the rear extremity of the dropper-fingers and consisting of a top bar 55, and fingers 56, attached to said top bar and extending downward therefrom, substantially as described.

7. In a corn-harvesting machine, a knife 25, provided with an aperture 27, the knife being pivoted to a rotating crank-arm through this aperture, an adjustable rack 33, hinged to the knife, said rack being provided with an irregularly-curved guide or way 40, a standard 31, suitably supported and passing through way or guide 40, in combination with a dropper adapted to receive the corn as it is delivered from the knife, said dropper consisting of a bar 44, hinged to the stationary frame-work of the machine and fingers hinged to bar 44, and suitable means for raising and lowering said dropper, substantially as described.

8. In a corn-harvesting machine, an adjustable platform or dropper adapted to receive the corn after being cut and carried thereto by the knife, said dropper consisting of a bar 44, hinged to the frame-work of the machine, fingers 45, hinged to bar 44 and independent from each other, and suitable means for raising and lowering the dropper, in combination with an adjustable rack 50, located just forward of the dropper, and an adjustable rack 54, located just in the rear thereof, substantially as described.

In testimony whereof I affix my signature in presence of two witnesses.

JOHN KEYS.

Witnesses:
   ISHAM R. HOWZE,
   WM. KOWALSKI.